Jan. 7, 1964     L. H. FLORA     3,116,776
NUT AND RETAINER WITH SEVERABLE SLEEVE PORTION
Filed Nov. 2, 1960     2 Sheets-Sheet 1
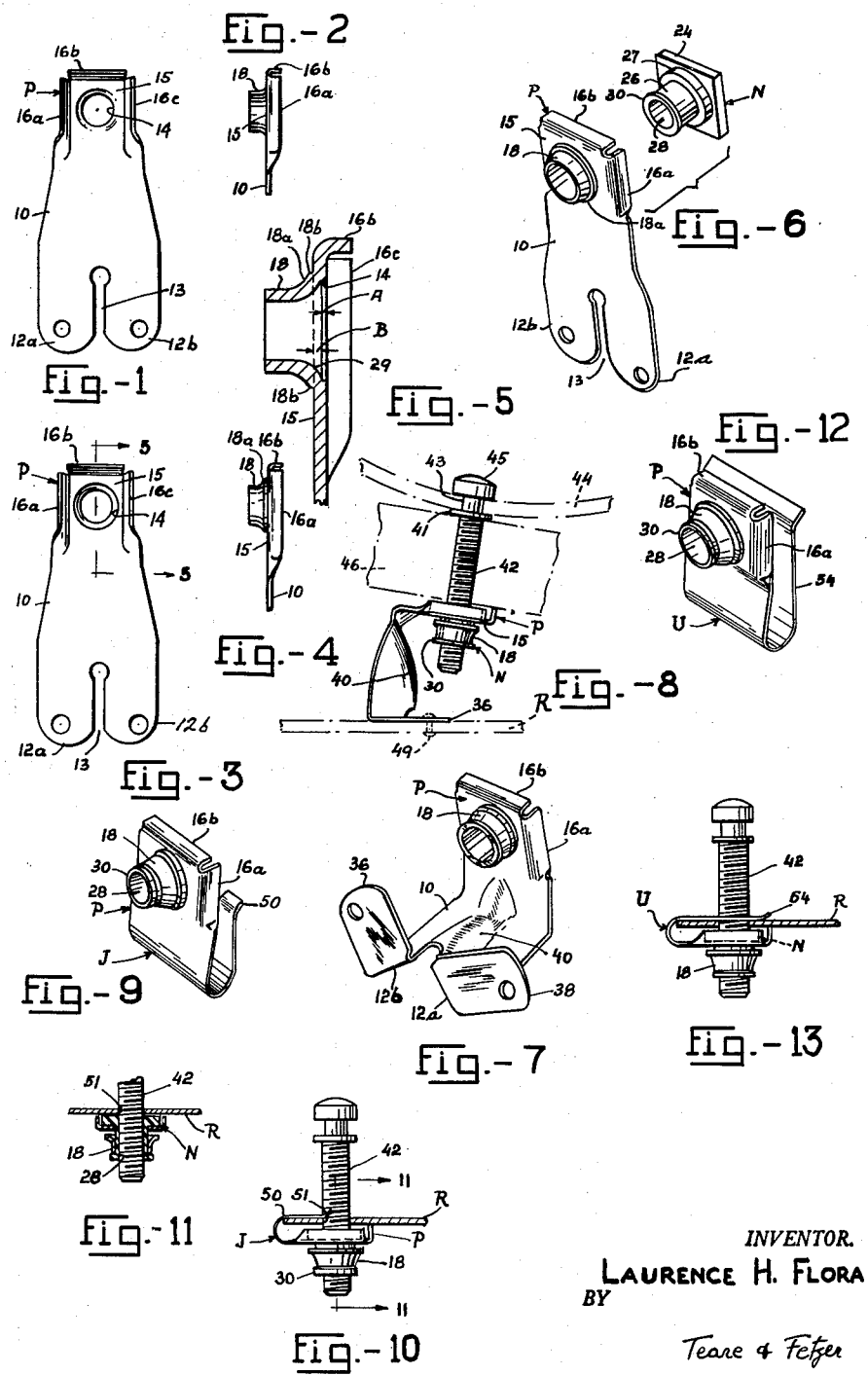
INVENTOR.
LAURENCE H. FLORA
BY
Teare & Fetzer
ATTORNEYS

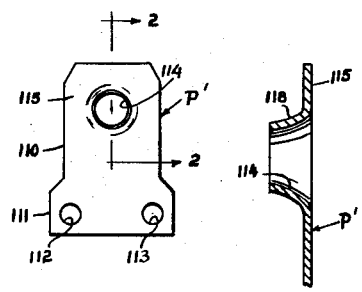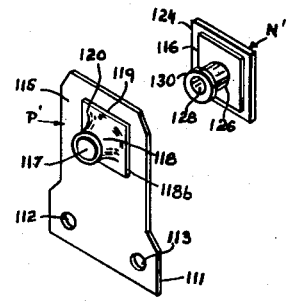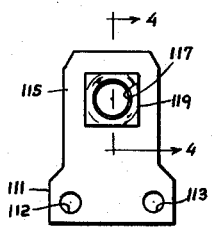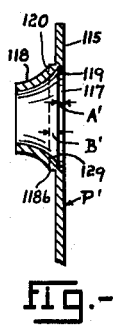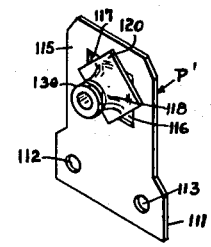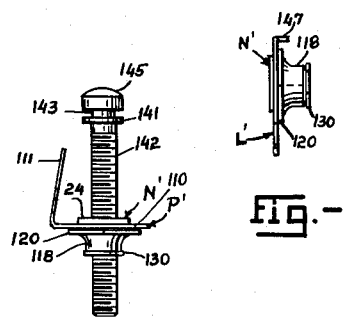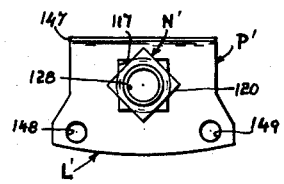

United States Patent Office 3,116,776
Patented Jan. 7, 1964

3,116,776
NUT AND RETAINER WITH SEVERABLE
SLEEVE PORTION
Laurence H. Flora, North Olmsted, Ohio, assignor to
Tinnerman Products, Inc., Cleveland, Ohio, a corporation of Ohio
Filed Nov. 2, 1960, Ser. No. 66,817
11 Claims. (Cl. 151—41.75)

This application relates to a fastening device for holding a nut of plastomeric material and more particularly to a fastening device for retaining such nut securely in bolt-receiving position. This is a continuation-in-part application of the copending United States patent applications of Laurence H. Flora, Serial No. 660,846, filed May 22, 1957 (now abandoned) and Serial No. 673,792, filed July 24, 1957 (now forfeited), respectively.

In many types of fastening applications, fasteners are used which are adapted to retain or receive a nut or the like in bolt-receiving position therein. The nut is often formed of plastomeric material, which is particularly advantageous since it is readily molded, has the required strength and elasticity, and is elastically thread impressionable. However, plastomeric materials have a disadvantageous aging characteristic, in that the material eventually becomes brittle and cracks to the extent that the fastener is no longer able to retain the nut in bolt-receiving position. A further disadvantage of such fasteners is the fact that they hold the nut very rigidly in position (before the nut becomes brittle and cracks), with the result that there is no allowance for misalignment of the units or parts which the fastener is adapted to connect. A further disadvantage of such fasteners is the fact that there is no simple and economical provision for preventing the nut from rotating when it is positioned in the fastener, particularly when the bolt is being threaded onto the nut. Additionally, there is no provision for preventing the nut from being pulled out of position in the fastener when a substantial axial load is applied to the nut in the direction from which the bolt is threaded onto the nut.

It is an object of the present invention to provide a fastening device for retaining a plastomeric nut or the like securely in bolt-receiving position even after the nut becomes brittle and cracks.

Another object of the invention is to provide a fastening device adapted to connect associated parts or units which are relatively misaligned with respect to each other.

A further object of the invention is to provide a fastening device having an aperture for receiving a sleeved plastomeric nut and having a separate sleeve adapted to embrace that portion of the nut sleeve which extends through the aperture to retain the nut in bolt-receiving position.

A further object of the invention is to provide a fastening device having simple and economical means for preventing a nut held therein from rotating about its longitudinal axis when it is positioned in the device.

A further object of the invention is to provide a fastening device for securely holding a plastomeric nut in position therein particularly when the nut is subjected to a substantial axial load.

A further object of the invention is to provide a fastening device adapted for retaining a plastomeric nut or the like which is characterized by simplicity of construction, economy of manufacture and a minimum of parts therein.

Briefly, the foregoing objects are accomplished by the provision of an apertured fastener for holding a sleeved plastomeric nut in bolt-receiving position upon a part to be joined. This is accomplished by providing a separate sleeve member adapted to tigthly embrace that portion of the nut sleeve which extends through the aperture in the fastener. The separate sleeve member may be formed from the apertured portion of the body of the fastener at the time the nut is assembled in the body. Additionally, the separate sleeve member has an outside diameter larger than the diameter of the aperture and operates to engage one side of the body to limit movement of the nut in one direction with resepct to the body. The nut may have a base portion overhanging the aperture and which engages the other side of the body to limit movement of the nut in the opposite direction with respect to the body. The fastener aperture may have a non-circular, preferably square configuration to enable it to receive a square shoulder on the base of the nut to prevent the same from rotating when it is positioned in the fastener. The base portion of the sleeve member may be of a square configuration such that the corners of such square base may considerably overlap the fastener aperture when the nut is positioned in the fastener, thereby enabling the same to securely retain the nut in position therein even when a substantial axial load is placed on the nut. The fastener may be provided with any suitable means for securing the same to a part to be joined. With the above "sleeve-in-sleeve" construction the plastomeric nut is securely held in bolt-receiving position even if the nut becomes brittle and cracks. Additionally, this construction allows the nut to "float" in position, thereby enabling the fastener to join misaligned parts.

Other objects and advantages of the invention will be apparent from the following description taken in conjunction with the drawings in which:

FIG. 1 is a front elevational view of a partially fabricated fastening device showing an initial step in the formation of the nut retaining portion thereof;

FIG. 2 is a side elevational view of the upper or nut retaining portion of the fastening device shown in FIG. 1;

FIG. 3 is a front elevational view of the fastening device shown in FIG. 1 and showing a further step in the formation of the nut retaining portion thereof;

FIG. 4 is a side elevational view of the upper or nut retaining portion of the fastening device shown in FIG. 3;

FIG. 5 is an enlarged side elevational sectional view taken along the line 5—5 of FIG. 3;

FIG. 6 is a perspective view of the fastening device shown in FIG. 3 and showing a plastomeric sleeve nut in position prior to its assembly into the nut retaining portion of the fastening device;

FIG. 7 is a perspective view of a further step in the formation of the fastening device shown in FIGS. 1 through 6;

FIG. 8 is a side elevational view of the completed fastening device shown in FIGS. 1 through 7, and showing a bolt threadedly retained in the plastomeric nut therein. This view also shows in dot-dash lines objects secured to the bolt shank and the bolt head, and a panel upon which the fastening device is secured;

FIG. 9 is a perspective view of a modified form of the fastening device shown in FIG. 8;

FIG. 10 is a side elevational view of a mounting assembly using the fastening device shown in FIG. 9. In this view, the panel upon which the fastening device is mounted is shown in section;

FIG. 11 is an end elevational sectional view taken along the line 11—11 of FIG. 10;

FIG. 12 is a perspective view of another modification of the fastening device shown in FIG. 8;

FIG. 13 is a side elevational view of a mounting assembly using the fastening device shown in FIG. 12. In this view, the panel upon which the device is fastened is shown in section;

FIG. 14 is a front elevational view of another embodiment of a partially fabricated fastening device of the invention, showing an initial step in the formation of the nut-retaining portion thereof;

FIG. 15 is an enlarged sectional view taken along the line 2—2 of FIG. 14;

FIG. 16 is a front elevational view of the fastening device shown in FIG. 14 and showing a further step in the formation of the nut-retaining portion thereof;

FIG. 17 is an enlarged sectional view taken along the line 4—4 of FIG. 16;

FIG. 18 is a perspective view of the fastening device shown in FIG. 16 and showing a plastomeric sleeve nut in position prior to its assembly into the nut retaining portion of the fastening device;

FIG. 19 is a perspective view of a further step in the formation of the fastening device shown in FIGS. 14 through 19;

FIG. 20 is a side elevational view of the completed fastening device shown in FIG. 19 and showing a bolt threadedly retained in the plastomeric nut therein;

FIG. 21 is a front elevational view of a modified form of the fastening device shown in FIG. 20;

FIG. 22 is a side elevational view of the fastening device shown in FIG. 21.

The fastener or clip of the invention is preferably constructed of a metallic material such as a blank of sheet metal strip. Referring to FIG. 1, a metal strip 10 may be cut to form a configuration substantially as shown, said strip having at one end the arms or legs 12a and 12b separated by the slot 13, and having the nut-receiving portion P formed at the other end thereof.

The nut-receiving portion P, in the present instance, includes a generally rectangular planular surface in the form of a body or base portion 15, which contains a centrally disposed aperture 14, and the flanges 16a, 16b and 16c, extending generally outward in substantially the same direction from the respective edges thereof. The flanges act to prevent rotation of a square-headed sleeve nut N, which the portion P is adapted to retain as will be hereinafter described. The aperture 14 may be formed by a punching and extrusion operation, whereby a tubular portion or sleeve 18 (FIG. 2) is formed circumferentially around the aperture. In the extrusion operation, the sleeve 18 is partially severed from the body 15 as shown in FIG. 3, 4 and 5, to form a weakened line of severance therebetween. At this point, the sleeve 18 is partially severed from the body by an amount which will enable its complete severage after the plastomeric nut N has been inserted therein, as will be hereinafter described. The ratio of the severed portion of the sleeve to the unsevered portion thereof is represented by the letters A and B respectively (FIG. 5). Although any suitable ratio may be used which will effect a facile severance of the extruded sleeve from the body after the nut is inserted therein, satisfactory severance has been achieved when the ratio of A to B is substantially 60%.

After the sleeve 18 has been extruded and partially severed as aforedescribed, the partially fabricated fastening device is ready to receive the nut N in the nut-receiving portion P. The nut N, in the present instance, is formed preferably of a plastomeric material and comprises a rectangular base or head portion 24 having a shank in the form of a tubular member or sleeve portion 26 disposed substantially centrally thereon and extending at substantially a right angle therefrom. The tube portion 26 contains an aperture or opening 28 which extends through the tube and through the base portion 24.

To assemble the nut N in the nut-receiving portion P, the fastening device and the nut are positioned as shown in FIG. 6, after which the tube portion 26 of the nut is forced through the body aperture 14 and through the sleeve 18. In the next successive operation, the sleeve 18 may be severed completely from the body 15, as shown in FIG. 8, thereby placing the nut in bolt-receiving position in the fastening device. This latter operation may be effected by the same force with which the tube portion 26 of the nut was forced into the sleeve 18 in one continuous operation, or it may be accomplished by a separate blow at the next station of the die to complete the severance of the extruded sleeve from the body 15. Disposed at the base end of the nut tube portion 26 is a circumferential flange 27 (FIG. 6), which is adapted to coact with the circumferential shoulder 29 (FIG. 5) on the sleeve 18 to facilitate the severance of the latter from the body of the fastener when pressure is exerted against the nut as aforesaid. Additionally, the tube portion 26 contain a circumferential flange 30 at the outer end thereof having an outside diameter greater than that of the sleeve 18 to limit movement of the tube portion in one direction within the sleeve.

When the nut N is positioned in the fastener in bolt-receiving position as aforedescribed, the base portion 24 of the nut overhangs the aperture 14 and engages the one side of the body 15 to limit movement of the nut in one direction with respect to the body. Additionally, the separable sleeve 18 has a base section 18a having a larger outside diameter than the diameter of the aperture 14 to provide means for engaging the other side of the body 15 to limit movement of the nut in the opposite direction with respect to the body. It will be seen from FIG. 5 that in the attached condition of the sleeve 18 to the body portion 15, the external defining edge 18b of the base section 18a of the sleeve overlaps the periphery of aperture 14, and that the aforementioned weakened line of connection between the severable sleeve and the body portion circumscribes the aperture 14 in juxtaposed relation thereto. Thus upon severance of the sleeve from the body portion, the overlapping edge 18b of the base section of the sleeve will prevent movement of the latter and associated nut from one side of the body portion through the aperture and toward the other side of the body portion.

Although the sleeve 18 has been described as extruded from the body 15, it may be formed as a separate part and subsequently secured to the nut tube portion 26 as aforedescribed.

Before or after the nut N has been inserted into the nut-receiving portion P, the fastening device may be fabricated into final form as shown in FIG. 7, wherein the leg portions 12a and 12b have the outer ends thereof bent diagonally and at an approximate right angle (with respect to the central portion of the strip 10), to form the apertured lugs or tabs 36 and 38, with which the fastening device may be mounted on a supporting or connection part R (FIG. 8). Additionally, the nut-receiving portion P may be bent at substantially a right angle in the same direction which the tabs 36 and 38 extend to complete the configuration of the device. The central portion of the strip 10 may have a raised or arched portion 40 to strengthen the fastener in that area. Thus the fastening device shown in FIG. 7 is a substantially U-shaped clip, wherein one arm of the U is the nut-receiving portion P, and the other arm of the U comprises the mounting lugs 36 and 38.

FIG. 8 illustrates an application of the fastener wherein a bolt 42 is threadedly disposed in the nut N. The bolt may have a flange 41 spaced from the bolt head 45 to form the circumferential slot or groove 43, which is adapted to retain an object or part 44 therebetween as shown. A mounting panel R may be provided on which the fastening device may be secured by means of the rivets 49 in the mounting lugs 36 and 38. Additionally, the bolt 42 may be adapted to retain an object or panel 46 or the like between the flange 41 thereon and the nut-retaining portion P of the fastener.

With the above "sleeve-in-sleeve" construction, the nut N is securely held in bolt-receiving position in the fastening device even if the nut becomes brittle and cracks. The construction also allows the nut, with the bolt therein, to "float" in position in the fastening device, thereby affording substantial allowance for misalignment between the parts the device is adapted to connect.

FIG. 9 illustrates a modified fastening device or clip J, which contains the nut-receiving portion P aforedescribed. In this instance, the clip is adapted for insertion onto the edge of an apertured panel or support R (FIG. 10). More specifically, the resilient fingers 50 in their normal, unstressed or unfastened state are spaced from the nut-receiving portion P of the clip a distance slightly less than the thickness of the panel R, to enable the clip to resiliently embrace or grip the panel when it is positioned on the edge thereof as shown in FIG. 10. Also, the clip J is adapted to receive the bolt 42 in the nut-receiving portion P for connecting parts or objects as aforementioned. In FIGS. 10 and 11, the panel R contains an aperture 51, which is in axial alignment with the aperture 28 in the nut, thereby allowing the bolt 42 to pass through the apertures for mounting purposes.

FIG. 12 illustrates another modification of a fastening device containing the nut-receiving portion P and, in this instance, takes the form of a clip U, which is adapted also for attachment over the edge of a panel or supporting part R (FIG. 13). The panel R, and the resilient finger 54 contain apertures therein respectively, which are in axial alignment with the aperture in the nut N, thereby enabling the bolt 42 to pass therethrough for mounting purposes as aforedescribed.

Although the invention has been described in connection with U-shaped and J-shaped fastening devices and the like, it will be understood that the invention may be applied to any type of fastening device adapted for receiving or retaining a nut therein.

The nut N may be formed of any suitable metallic or non-metallic material; however, a plastomeric material is preferred since such material is readily molded, has the required strength and elasticity and is elastically thread impressionable.

The supporting part or panel R may be of any suitable material such as sheet metal, wood, fiberboard, or the like; however, inasmuch as the invention is employed mainly in metallic structures, the part R is usually in the form of a metallic panel or plate-like member.

Referring now to FIGS. 14 to 19, there is illustrated a further modification of the invention. The fastener or clip of this modification is preferably constructed of a metallic material, such as a blank of sheet metal strip. Referring to FIG. 14, a metal strip 110 may be cut to form a configuration substantially as shown, said strip having at one end the mounting or bracket portion 111, and having the nut-receiving or retaining portion P' formed at the other end thereof. The bracket portion 111 contains the apertures 112 and 113, which may be used to mount the fastener on an object.

The nut-receiving portion P', in the present instance, includes a generally rectangular planar surface in the form of a body or base portion 115, which contains an aperture 114 disposed substantially centrally thereon. The aperture 114 may be formed by a punching and extrusion operation, whereby a tubular portion or sleeve 118 (FIG. 15) is formed circumferentially around the aperture. In the extrusion operation, the sleeve 118 is partially severed from the base 115 as shown in FIGS. 16, 17 and 18, to form a weakened line of severance 119 therebetween. At this point, the square based sleeve 118 is partially severed from the body 115 by an amount which will enable its complete severage after the plastomeric nut N' has been inserted therein. Although the line of severance 119 may be of any suitable configuration, in the present instance, it is configured substantially in the form of a rectangle. Accordingly, the base 120 of the sleeve 118 has a rectangular or polygonal configuration, the purpose of which will be hereinafter explained.

The ratio of the severed portion of the sleeve to the unsevered portion thereof is represented by the letters A' and B' respectively (FIG. 17). Although any suitable ratio may be used which will effect a facile severance of the extruded sleeve from the body after the nut is inserted therein, satisfactory severance has been achieved when the ratio of A' to B' is substantially 60%. As can be seen in FIG. 17, the external defining edge 118b of polygonal base 120 of the sleeve 118 overlaps the periphery of the polygonal aperture 117 in portion P', and the aforementioned weakened line of connection 119 between the severable sleeve and the body portion 115 encompasses the aperture 117 in juxtaposed relation thereto.

After the sleeve 118 has been extruded and partially severed as aforedescribed, the partially fabricated fastening device is ready to receive the nut N' in the nut-receiving portion P'. The nut N', in the present instance, is formed preferably of a plastomeric material and comprises a rectangular base or head portion 124 (FIG. 18) having a shank in the form of a tubular member or sleeve portion 126 disposed substantially centrally thereon and extending at substantially a right angle therefrom. The tube portion 126 contains an aperture or opening 128 which extends through the tube and through the base portion 124. A raised portion or shoulder 116 of polygonal shape in plan and having a substantially square configuration in the embodiment illustrated, is formed at the juncture of the tube portion 126 and the base 124 of the nut and is adapted to be telescoped into the polygonal shaped or squared opening 117 in the fastener base 115, which opening 117 is completely formulated when the sleeve 118 is severed from the base 115. When thus positioned, the shoulder 116 functions to prevent the nut from rotating in the fastener about the longitudinal axis of the nut. Although the shoulder 116 and the coacting opening 117, in the present instance, have a square configuration, the shoulder and opening may have any suitable complementary polygonal configuration to enable them to coact to prevent the nut from rotating as aforesaid.

To assemble the nut N' in the nut-receiving portion P', the fastening device and the nut are positioned as shown in FIG. 18, after which the tube portion 126 of the nut is forced through the body aperture 117 and through the sleeve 118. In the next successive operation, the sleeve 118 along with its square base 120, may be severed completely from the body 115, as shown in FIG. 19, thereby placing the nut in bolt-receiving position in the fastening device. This latter operation may be effected by the same force with which the tube portion 126 of the nut was forced into the sleeve 118 in one continuous operation, or it may be accomplished by a separate blow at the next station of the die to complete the severance of the extruded sleeve from the body 115. At this point, the squared opening 117 formed in the fastener base 115 and the nut shoulder 116 disposed therein, prevents the nut from rotating in the fastener as aforedescribed.

The nut shoulder 116 is adapted also to coact with the circumferential shoulder 129 (FIG. 17), on the sleeve 118 to facilitate the severance of the latter from the body of the fastener when pressure is exerted against the nut as aforesaid. Additionally, the tube portion 126 contains a circumferential flange 130 at the outer end thereof having an outside diameter greater than that of the outer end of the sleeve 118 to limit movement of the tube portion in one direction within the sleeve.

When the nut N' is positioned in the fastener in bolt-receiving position as aforedescribed, the base portion 124 of the nut overhangs the aperture 117 and engages the one side of the body 115 to limit movement of the nut in one direction with respect to the body. Additionally, with the parts thus positioned, the sleeve 118 (with the nut therein) may be rotated approximately 45° about its longitudinal axis in either direction so that the corners of the square base 120 thereof materially overlap the opening 117 or, in effect, the other side of the body 115, to limit movement of the nut in the other direction with respect to the body as shown in FIG. 19, such that the nut has substantially increased pull-out resistance in said other direction.

The extruded sleeve 118 may be rotated to overlap the square opening 117 from which it was extruded, as described above, at any one of several stages during the formation of the fastening device. For example, it may be rotated while the fastening device is still in the die after the sleeve 118 is extruded; or it may be rotated manually as the fastening device is assembled in the application for which it is intended; or the shank 126 of the nut may be undercut so the sleeve 118 may rotate freely thereon, such that the vibration set up during the plating process will cause the sleeve to rotate into its assembled position.

Although the sleeve 118 has been described as extruded from the body 115, it may be formed as a separate part and subsequently secured to the nut tube portion 126 as aforedescribed.

Before or after the nut N' has been inserted into the nut-receiving portion P', the fastening device may be fabricated into final form as shown in FIG. 20, wherein the bracket portion 111 is bent at an approximate right angle (with respect to the central portion of the strip 110), to form a means by which the fastening device may be mounted on a supporting or connecting part. Thus, the fastening device shown in FIG. 20 is a substantially L-shaped clip, wherein one arm of the L is the nut-receiving portion P', and the other arm of the L comprises the mounting or bracket portion 111.

FIG. 20 additionally illustrates an application of the fastener wherein a bolt 142 is threadedly disposed in the nut N'. The bolt may have a flange 141 spaced from the bolt head 145 to form the circumferential slot or groove 143, which is adapted to retain an object or part therebetween.

With the above "sleeve-in-sleeve" construction, the nut N' is securely held in bolt-receiving position in the fastening device even if the nut becomes brittle and cracks. The construction also allows the nut, with the bolt therein, to "float" in position in the fastening device, thereby affording substantial allowance for misalignment between the parts the device is adapted to connect.

FIGS. 21 and 22 illustrate a further modified fastening device or clip L', which contains the nut-receiving portion P' aforedescribed. In this instance, the clip is adapted for insertion onto the edge of a strip of molding or onto a wall having a slot therein. More specifically, the flange 147 is adapted to fit over an edge of the molding or into a slot in the wall or in the molding, after which the fastener may be secured thereon by mounting bolts or studs positioned in the apertures 148 and 149.

Although the invention has been described in connection with L-shaped fastening devices and the like, it will be understood that the invention may be applied to any type of fastening device adapted for receiving or retaining a nut therein.

The nut N' may be formed of any suitable metallic or non-metallic material; however, a plastomeric material is preferred since such material is readily molded, has the required strength and elasticity and is elastically thread impressionable.

The terms and expressions which have been employed are used as terms of description, and not of limitation, and there is no intention, in the use of such terms and expressions, of including any equivalents of the features shown or described or portions thereof, but it is recognized that various modifications are possible within the scope of the invention claimed.

I claim:

1. In a fastening device comprising a substantially flat metal body portion having an aperture therethrough, a sleeve portion projecting outwardly from one side of said body portion and being formed from the material of said body portion at said aperture, said sleeve portion comprising an integral base section having means thereon which overlaps the periphery of said aperture, said base section being integrally connected to said body portion along a weakened line of connection encompassing the periphery of said aperture in juxtaposed relation thereto, a nut mounted in said aperture, said nut having a shank, a base on one end of said shank extending transversely thereof, said base including a raised shoulder facing in the direction of projection of said shank, said shank being received in said sleeve portion with said shoulder being received in said aperture, said sleeve portion being adapted to be severed from said body portion along said weakened line of connection upon application of a predetermined pressure by said shoulder on said nut to the interior of said sleeve portion applied by said nut from the other side of said body portion, said overlapping means being adapted to limit axial movement of the severed sleeve portion and associated nut from said one side of said body portion through said aperture toward said other side of said body portion, said base being adapted to limit axial movement of said nut in the other axial direction, and means on said body portion and on said nut for limiting relative rotative movement between said nut and said body portion.

2. In a fastening device comprising a substantially flat sheet metal body portion having an aperture therethrough, said body portion comprising an integral sleeve portion projecting outwardly from one side of said body portion and being formed from the material of said body portion at said aperture, said sleeve portion comprising an integral base section having means which overlaps the periphery of said aperture, said base section being integrally connected to said body portion along a continuous weakened line of connection extending about the periphery of said aperture in juxtaposed relation thereto, a nut mounted in said aperture, said nut including a shank received in said sleeve portion in held relation, said sleeve portion being adapted to be severed from said body portion along said weakened line of connection upon application of a predetermined pressure to the interior of said sleeve portion applied from the other side of said body portion by said nut, said overlapping means being adapted to prevent movement of the severed sleeve portion and associated nut from said one side of said body portion through said aperture and toward said other side of said body portion, and means projecting outwardly from said body portion and in a direction generally opposite to the direction of projection of said sleeve portion, said last mentioned means being adapted for holding engagement with the nut to limit relative rotation between the nut and said body portion.

3. A fastening device in accordance with claim 2 including means for attaching said body portion to a supporting part.

4. In a fastening device comprising a substantially flat sheet metal body portion having an aperture therethrough, a sleeve portion projecting outwardly from one side of said body portion and being formed from the material of said body portion at said aperture, said sleeve portion comprising an integral base section, external defining edge portions of which overlap the periphery of said aperture, said base section being initially integrally connected to said body portion along a continuous weakened line of connection extending about the periphery of said aperture in juxtaposed relation thereto, the interior of said base section defining a shoulder portion adjacent the connection of said base section to said body portion, a nut having a shank, a base on one end of said shank extending transversely thereof, said base including a raised shoulder facing in the direction of projection of said shank, said shank being received in said sleeve portion in snug fitting frictional holding relation and with said shoulder engaging said shoulder portion, said sleeve portion being adapted to be severed from said body portion along said weakened line of connection upon application of a predetermined pressure by said shoulder on said nut to said shoulder portion and applied by said nut from the other side of said body portion, said overlapping edge portions being adapted to prevent movement of the severed sleeve portion from said one side of said body portion through said aperture toward said other side of said body portion, and means on said body portion extending outwardly from said body portion and in a direction generally away from the direction of projection of said sleeve portion, said last mentioned means being engageable in holding relation with said base of said nut to limit relative rotation between said nut and said body portion.

5. In a fastening device comprising a substantially flat sheet metal body portion having an aperture therethrough, a sleeve portion projecting outwardly from one side of said body portion and being formed from the material of said body portion at said aperture, said sleeve portion comprising an integral base section, external defining edge portions of which overlap the periphery of said aperture, said base section being initially integrally connected to said body portion along a continuous weakened line of connection extending about the periphery of said aperture in juxtaposed relation thereto, the interior of said base section defining a shoulder portion adjacent the connection of said base section to said body portion, flange means on said body portion projecting outwardly therefrom and in a direction generally opposite to the direction of projection of said sleeve portion, a plastomeric nut adapted for threaded holding coaction with a bolt element, said nut having a shank and a base at one end of said shank extending transversely thereof, said base including a raised shoulder facing in the direction of projection of said shank, said shank being received in snug fitting frictional holding relation in said sleeve portion with said shoulder on said nut engaging said shoulder portion on said sleeve portion, said sleeve portion being severed from said body portion along said weakened line of connection upon application of a predetermined pressure to said nut applied from the other side of said body portion whereby said base of said nut engages said other side of said body portion to limit axial movement of said nut in one direction with respect to said body portion, said overlapping edge portions of said base section of said severed sleeve portion limiting movement of said nut with respect to said body portion in an axial direction opposite to that of said one axial direction, said flange means being engageable with said base of said nut in holding relation to limit relative rotational movement between said nut and said body portion, and means connected to said body portion for mounting the same on a supporting part.

6. In a fastening device comprising a substantially flat sheet metal body portion having a circular aperture therethrough, a tubular sleeve portion projecting outwardly from one side of said body portion and being formed from the material of said body portion at said aperture, said sleeve portion comprising an annular integral base portion, the external defining edge of said base section overlapping the periphery of said aperture, said base section being initially integrally connected to said body portion along a continuous weakened line of connection circumscribing said aperture in juxtaposed relation therewith, the interior of said base section defining an annular shoulder portion adjacent the connection of said base section to said body portion, flange means on said body portion projecting outwardly from the other side thereof and in a direction generally opposite to the direction of projection of said sleeve portion, a plastomeric nut adapted for threaded holding coaction with a bolt element, said nut having a cylindrical shank and a rectangular shaped base on one end of said shank extending transversely thereof, said base including a raised annular shoulder facing in the direction of projection of said shank and being axially aligned therewith, said shank being received in snug fitting frictional holding relation in said sleeve portion with the free end of said shank extending beyond the free end of said sleeve portion and with said shoulder on said nut engaging said shoulder portion on said sleeve portion, abutment means on the free end of said shank disposed in overlapping relation with the free end of said sleeve portion to aid in preventing withdrawal of said nut from said sleeve portion, said sleeve portion being severed from said body portion along said weakened line of connection upon application of a predetermined pressure to said nut applied from said other side of said body portion whereby said base of said nut engages said other side of said body portion to limit axial movement of said nut in one direction with respect to said body portion, said overlapping edge of said base section of said severed sleeve portion limiting movement of said nut with respect to said body portion in an axial direction opposite to that of said one axial direction, said flange means engaging said base of said nut in holding relation to limit relative rotational movement between said nut and said body portion, and means connected to said body portion for mounting the body portion on a supporting part.

7. A fastening device including a sheet metal fastener bent intermediately to provide two arm portions which extend in the same general direction, one of said arm portions having a nut deceiving section, the other of said arm portions comprising means for securing the device to a supporting part, said nut receiving section comprising a substantially flat body portion having an aperture therethrough, a sleeve portion projecting outwardly from one side of said body portion and being formed from the material of said body portion at said aperture, said sleeve portion comprising an integral base section, external defining edge portions of which overlap the periphery of said aperture, said base section being initially integrally connected to said body portion along a continuous weakened line of connection extending about the periphery of said aperture in juxtaposed relation therewith, the interior of said base section defining a shoulder portion adjacent the connection of said base section to said body portion, flange means on said body portion extending outwardly from the other side thereof and in a direction generally opposite to the direction of projection of said sleeve portion, a plastomeric nut having a shank and a base at one end of the shank extending transversely thereof, said base including a raised shoulder facing in the direction of projection of said shank, said shank being received in snug fitting frictional holding relation in said sleeve portion with the free end of said shank extending beyond the free end of said sleeve portion and with said shoulder on said nut engaging said shoulder portion on said sleeve portion, abutment means on the free end of said shank overlapping the free end of said sleeve portion to aid in preventing withdrawal of said nut from said sleeve portion, said sleeve portion being severed from said body portion along said weakened line of connection upon application of a predetermined pressure to said nut applied from said other side of said body portion whereby said base of said nut engages said other side of said body portion to limit axial movement of said nut in one direction with respect to said body portion, said overlapping edge portions of said base section of said severed sleeve portion limiting movement of said nut with respect to said body portion in an axial direction opposite to said one axial direction, said flange means engaging said base of said nut in holding relation to limit relative rotational movement between said nut and said body portion.

8. In a fastening device including a fastener formed from a flat strip of sheet metal and bent intermediately to provide two arm portions which extend in the same general direction, one of said arm portions having a nut receiving and supporting section, the other of said arm portions comprising means for securing the device to a supporting part, said nut receiving section comprising a substantially flat body portion having a circular aperture therethrough, a tubular sleeve portion projecting outwardly from one side of said body portion and being formed from the material of said body portion at said aperture, said sleeve portion comprising an integral annular base section axially aligned with the remainder of said sleeve portion, the external defining edge of said base section overlapping the periphery of said aperture, said base section being initially integrally connected to said body portion along a continuous weakened line of connection circumscribing the periphery of said aperture in juxtaposed relation therewith, the interior of said base section defining an annular shoulder portion adjacent the connection of said base section to said body portion, flange means on said body portion extending outwardly from the other side thereof and in a direction generally opposite to the direction of projection of said sleeve portion, a plastomeric nut having a cylindrical like shank and a rectangular base at one end of the shank extending transversely of said shank, said base including a raised annular shoulder axially aligned with said shank and facing in the direction of projection of said shank, said nut being axially apertured, said shank being received in snug fitting frictional holding relation in said sleeve portion with the free end of said shank extending beyond the free end of said sleeve portion and with said shoulder on said nut engaging said shoulder portion on said sleeve portion, abutment means on the free end of said shank overlapping the free end of said sleeve portion to aid in preventing inadvertent withdrawal of said nut shank from said sleeve portion, said sleeve portion being severed from said body portion along said weakened line of connection upon application of a predetermined pressure to said nut applied in an axial direction from said other side of said body portion whereby said base of said nut engages said other side of said body portion to limit axial movement of said nut in one direction with respect to said body portion and said severed sleeve portion is disposed in spaced relation to said one side of said body portion, said overlapping edge of said base section of said severed sleeve portion limiting axial movement of said nut with respect to said body portion in a direction opposite to said one axial direction, said flange means engaging in holding coaction with said base of said nut to limit relative rotary movement between said nut and said body portion, and a threaded fastener element, such as a bolt, having a threaded shank portion disposed in threaded holding coaction with said nut.

9. In a fastening device comprising a sheet metal member having a substantially flat body portion, said body portion having a polygonal shaped aperture therethrough, a generally tubular sleeve portion projecting outwardly from one side of said body portion and being formed from the material of said body portion at said aperture, said sleeve portion including an integral, polygonal shaped base section of a similar configuration in plan view as the configuration of said aperture, the external edges of said base section overlapping the peripheral edges of said aperture and with said base section being initially integrally connected to said body portion along a continuous weakened line of connection encompassing the periphery of said aperture, a nut having a base engageable with the other side of said body portion for limiting movement of said nut in one axial direction and with respect to said body portion, said nut having a cylindrical shank portion received in snug fitting frictional holding relation in said sleeve portion, said base of said nut having a raised polygonal shaped shoulder thereon received in said aperture, the edges of said raised shoulder on said nut being engageable with the confronting defining surfaces of said aperture to prevent rotation of said nut with respect to said body portion, said base section having a shoulder portion on its interior adjacent its connection to said body portion engageable with said raised shoulder on said nut in the assembled position of said nut in said aperture, said sleeve portion being adapted to be severed from said body portion along said weakened line of connection upon application of a predetermined force to said nut, said severed sleeve portion being adapted to be rotated with respect to said nut, whereby the corners of said base section will positively overlap the peripheral edges of said aperture and thus said sleeve will be positively engageable with said one side of said body portion to limit axial movement of said nut in a direction opposite to said one axial direction and with respect to said body portion.

10. A fastening device for connecting associated parts comprising in combination, a sheet metal member including a body portion having a polygonal shaped aperture therethrough, a tubular sleeve portion projecting outwardly from one side of said body portion and being formed from the material of said body portion at said aperture, said sleeve portion including an integral polygonal shaped base section with the external edges of said base section overlapping the peripheral edges of said aperture, said base section being initially integrally connected to said body portion along a continuous weakened line of connection encompassing said aperture, said base section having a shoulder portion on the interior thereof adjacent the connection of said base section to said body portion, a plastomeric nut adapted for threaded holding coaction with a bolt element, said nut having a cylindrical shank and a base on one end of said shank extending generally transversely thereof, said base of said nut including a raised polygonal shaped shoulder facing in the direction of projection of said shank and formed complementary to said aperture, said shank being received in generally snug-fitting relation in said sleeve portion with the free end of said shank extending beyond the free end of said sleeve portion, and with said shoulder on said nut being received in said complementary aperture in said body portion and being engageable with said shoulder portion on said base section of said sleeve portion, said base of said nut engaging the other side of said body portion to limit axial movement of said nut in one direction with respect to said body portion, said shoulder on said nut coacting with confronting defining surfaces of said aperture to prevent rotation of said nut with respect to said body portion, said free end of said shank of said nut including a projecting flange overlying the free end of said sleeve portion for limiting withdrawal movement of said nut from said sleeve portion, said sleeve portion being adapted to be severed from said body portion along said weakened line of connection upon application of a predetermined force to said nut, said severed sleeve portion being adapted to be rotated with respect to said nut so that the corners of said base section of said sleeve portion positively overlap the peripheral edges of said aperture in engageable relation with said one side of said body portion, to limit movement of said nut with respect to said body portion in an axial direction opposite to that of said one axial direction, and means on said member for mounting the same on a part to be joined.

11. In a fastening device for facilitating the positioning of a threaded member such as a bolt in an assembly of parts to be attached comprising, a substantially flat metal body portion having a polygonal shaped aperture therethrough, a one-piece plastomeric nut having a cylindrical-like shank, said shank having an axially projecting bolt receiving opening extending completely therethrough, a base on one end of said shank extending transversely thereof, said base including a raised polygonal shaped shoulder symmetrically formed with respect to the axis of said shank to encompass said shank and formed generally complementary to said aperture, said shoulder facing in a direction of projection of said shank, said nut being disposed in said aperture with said shank projecting from one side of said body portion and with said shoulder being received in said aperture, said shoulder being engageable with the defining boundary of said aperture for preventing rotation of said nut with respect to said body portion, said base being engageable with the other side of said body portion to limit axial movement of said nut in one direction with respect to said body portion, a sleeve element frictionally encompassing said shank intermediate the free end of said shank and said shoulder, said sleeve element being engageable with said one side of said body portion to limit axial movement of said nut with respect to said body portion in the opposite direction as compared to said one direction, said sleeve element being spaced a sufficient axial distance from said base so as to provide for limited axial play of said nut in said aperture whereby said nut floats in said aperture thereby enabling the fastener device to join misaligned parts, a radially extending abutment integrally formed on the free end of said shank and disposed in overlapping relation with the confronting end of said sleeve element to aid in preventing withdrawal of said nut from said sleeve element, and means connected to said body portion for attaching said fastening device to a part to be joined.

References Cited in the file of this patent

UNITED STATES PATENTS

| | | |
|---|---|---|
| 419,611 | McGrath | Jan. 14, 1890 |
| 1,390,645 | Ritter | Sept. 13, 1921 |
| 1,458,965 | Bassett | June 19, 1923 |
| 1,460,471 | Bassett | July 3, 1923 |
| 1,473,910 | Lambert | Nov. 13, 1923 |
| 1,530,679 | Lambert | Mar. 24, 1925 |
| 2,633,175 | Desbrueres | Mar. 31, 1953 |
| 2,802,503 | Zupa | Aug. 13, 1957 |
| 2,847,238 | Bolling | Aug. 12, 1958 |
| 3,001,567 | Brill | Sept. 26, 1961 |